United States Patent Office 2,772,948
Patented Dec. 4, 1956

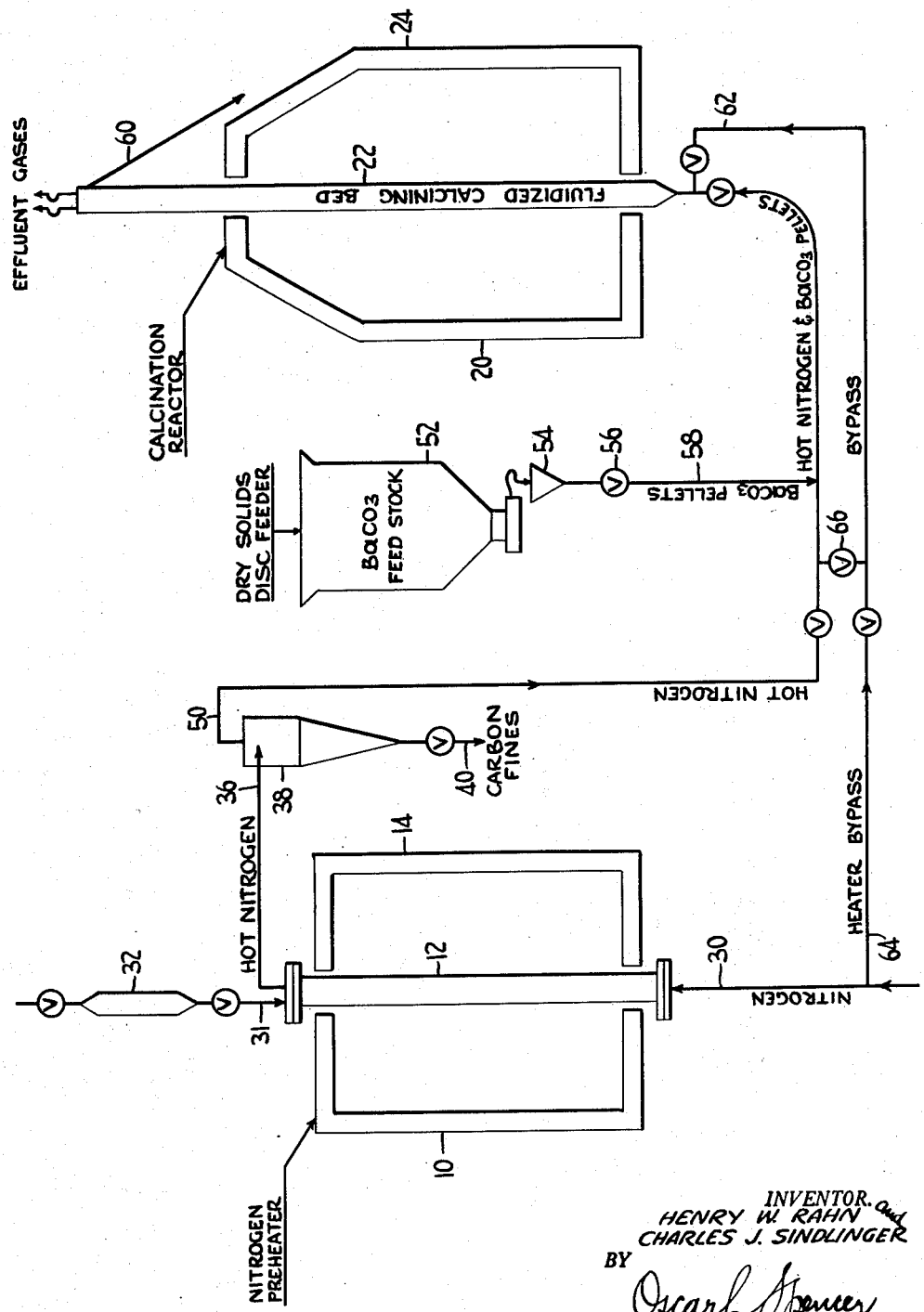

2,772,948

CALCINATION OF BARIUM CARBONATE

Henry W. Rahn and Charles J. Sindlinger, Corpus Christi, Tex., assignors to Columbia-Southern Chemical Corporation Application June 10, 1955, Serial No. 514,562

11 Claims. (Cl. 23—186)

This invention relates to a novel method of calcining barium carbonate to barium oxide. While calcination of barium carbonate has been investigated by prior workers and batch processes actually used in commercial operation, no satisfactory process for continuous calcination appears to have been worked out prior to this invention. Since the reaction is endothermic, heat must be supplied. However, direct fired methods commonly applied to calcium carbonate are not suitable since the reaction mixture either fuses in the kiln during calcination or is very incompletely calcined. Hence, calcination of barium carbonate must be effected in an indirect manner by supplying heat through a wall of the calciner or other receptacle in which the barium carbonate is retained.

The supply of heat in this manner is quite difficult because both barium carbonate and barium oxide are themselves good heat insulators. Because of this, transmission of heat through a layer of barium carbonate is slow and the temperature of the heat source has been required to be high. This tends to cause undesirable fusion of the product and the product normally is impure and rather incompletely calcined.

In the course of the experiments resulting in the present invention, it has been found that improved heat transfer can be attained by calcining a fluidized bed of barium carbonate in a gas stream while supplying heat through the walls of the calcining chamber. However, even in such a process, we have found that a very careful correlation of conditions of operation must be attained before efficient calcination is accomplished.

According to this invention we have effectively calcined barium carbonate by heating a bed of porous granules of finely divided barium carbonate and carbon bonded together, the granules being largely or even substantially wholly in a particle size range of 4 to 80 mesh, at a temperature of 850 to 1025° C., preferably 900 to 975° C., while fluidizing the bed in an upwardly rising stream of nitrogen and correlating the rate of heating and the rate of nitrogen flow so that the concentration of nitrogen in the evolved gas flowing from the bed is above about 70 percent, preferably above 80 percent, by volume while maintaining the concentration of oxygen, water, and carbon dioxide in the nitrogen supplied to the bed low and supplying heat through a wall of the reactor or a wall of a tube or like heater in the reactor.

In order to supply heat rapidly and efficiently, it should be supplied through a wall having the high heat conductivity of metal. To prevent impairment of the metal by the abrasive, corrosive creep and other actions of the process, the temperature cannot be allowed to rise to an excessive level. Temperatures of 850 to 1025° C., preferably 825 to 975° C., are required. At such temperatures, we have been able to effect the desired calcination of the barium carbonate in metal calciners. Suitable metals of construction are "Inconel" and like nickel alloys, metallic titanium, and the like.

In order to effect calcination at this temperature range, it is necessary to correlate carefully the particle size of the barium carbonate undergoing calcination with the rate of nitrogen flow and the rate of heat input. We have found that for efficient and economic calcination the barium carbonate should be in the form of granules of finely divided barium carbonate and carbon bonded together.

The size of these granules should neither be too high nor too low. If they are too large, the fluidization and heat transfer is poor and the calcination rate is undesirably slow. If they are too small, they tend to be blown from the calciner and may tend to fuse or deposit on the heating walls making heat transfer poor. Thus, the granules should be in the particle size range of 4 to 80 mesh. For best results with a minimum of scaling, at least 50 percent by weight of the granules should be between about 4 and 30 mesh. Normally, the average particle size should be about 0.008 to 0.04 inch in diameter. A mixture of particles which differ in particle diameter from the smallest to the largest particle entering the bed by a factor of at least 5 (the diameter of the largest particle being at least 5 times the diameter of the smallest) is desirable.

In general, it is undesirable to calcine raw barium carbonate of the above particle size. Consequently, the barium carbonate itself should be of a relatively fine particle size, usually being well below 100 mesh. This barium carbonate is then made up into pellets or particles by mixing the barium carbonate, carbon black, and a suitable binder such as a carbonaceous binder. Such binder must be capable of decomposing to evolve carbon or a gas, such as carbon dioxide, at the temperature of operation. Typical binders are starch paste, such as pastes formed from wheat starch and other grain starches, including corn starch, rice starch, and various other gluten containing materials, glue, sugars, syrups, molasses, and the like, and various other carbonaceous binders of analogous character, particularly those compatible with water. The amount of binder which is used is not large and thus does not appreciably affect the required carbon content of the barium carbonate-carbon mixture. Usually, water is used in conjunction with the binder.

In the production of these granules or pellets, carbon, barium carbonate, and the binder are mixed with water in a suitable manner, for example, in a pug mill, to produce a plastic formable mass, and the product is extruded or otherwise formed into rods or like shape, usually having a diameter of ⅛ to ¼ inch. These rods are dried at a low temperature, for example, 100 to 150° C., in order to remove a major portion of the water therefrom. After the drying operation, the extruded rods are found to lose less than 0.1 percent by weight of moisture when heated at 100° C. over a period of 24 hours. This amount is not objectionable. However, larger amounts tend to cause scaling or fusion in the calcination zone. Thereafter, the granules are lightly crushed and screened in order to obtain particles of the size specified above.

In the practice of the calcination, a reactor of tubular or other shape constructed of metal or material of like heat conductivity is provided. An upwardly flowing stream of nitrogen is passed through the reactor and the granules of barium carbonate are suspended therein. If desired, to initiate the reaction, barium oxide granules of the same size may be introduced and fluidized. The fluid bed is brought up to temperature by heating the outside wall of the reactor or by internally heated tubes disposed in the reactor. Additional heat may be supplied by preheating the nitrogen. Barium carbonate granules are supplied to the bed and heating is continued, thus effecting the calcination. Barium oxide is withdrawn periodically or continuously.

We have encountered serious difficulty due to scaling of the walls of the calciner and fusion of the product when the nitrogen was of low purity. This is due to oxygen, carbon dioxide, and/or water. The concentration of each of these impuriites in the nitrogen stream should be below ½ percent, preferably below 0.1 to 0.2 percent by volume.

Supply of nitrogen should be sufficiently high not only to fluidize the bed but also to provide at least 70 percent, preferably in excess of 80 percent, by volume of nitrogen in the gas escaping the bed. Hence, nitrogen flow rate must be correlated with the rate of heat input and the particle size so that this objective may be achieved. Nitrogen flow rate should normally be controlled so that the gas velocity of the bed at the mid-point between the bottom and the top of the bed is held at 1 to 7 feet per second, this velocity being calculated at bed temperature from the gas supplied and generated in the reaction without allowance for the space occupied by the solid components of the bed, i. e., assuming the reactor to be empty.

The carbon in the granules should be sufficient to effect the calcination. The theoretical amount of carbon required to react with the barium carbonate to produce barium oxide and carbon monoxide is about 6 percent by weight of the barium carbonate. Where the carbon concentration exceeds more than about 6 percent, there exists a tendency for the carbon to remain in the barium oxide product produced. When this product is heated in air or oxygen in order to produce barium peroxide, the residual carbon reacts to form carbon dioxide with consequent production of barium carbonate. Such reaction, of course, tends to defeat the purpose of the process. On the other hand, it is usually impossible to operate with exactly the stoichiometric amount of carbon. Consequently, an amount of carbon of about 6 to 8 percent, based upon the barium carbonate in the composition, normally is used. Higher concentrations of carbon up to 20–30 percent (or even more) by weight of the barium carbonate may be used. However, such concentrations contaminate the barium oxide produced.

The depth of the fluidized bed normally ranges from about 1 to 25 feet.

The apparatus diagrammatically illustrated in Fig. 1 may be used in performance of the fluidized calcination herein contemplated. This apparatus comprises a nitrogen preheater 10 which is connected to the fluidizing calciner 20. The nitrogen preheater comprises a heater tube 12 which may be of metal or other suitable material and in which the preheating of the nitrogen actually is conducted. Surrounding this heater tube is a heating jacket furnace 14. Suitable sources of heat, such as gas burners and the like, are provided within the furnace 14. The calcination reactor also comprises a metal tube 22 disposed in a furnace 24 which may be a gas fired furnace.

In the practice of the process, nitrogen is introduced at a rapid rate into the lower portion of the tube 12 and flows upwardly through line 30 and into the lower portion of tube 12. This nitrogen flows upwardly through a fluidized bed of carbon granules or like relatively coarse inert materials (not shown) which are disposed in tube 12. Additional carbon granules are added as needed from a charging device 32 through line 34. The fluidized bed is heated to an elevated temperature, usually above 500° C., and frequently as high as 1500° C., by gas burners disposed in the gas furnace 14, thereby converting oxygen and carbon dioxide in the nitrogen to carbon monoxide. The heated nitrogen escapes from the top of the preheater through line 36 and is discharged into a cyclone separator 38 to separate dust. This dust is collected in the bottom of the separator and may be removed from time to time through the bottom outlet 40.

The nitrogen is removed from the cyclone separator through line 50 and is led to the bottom of tube 22 which tapers to a conical inlet. Barium carbonate granules are fed from a supply bin 52 into a hopper 54 and thence through a rotating star valve 56 into line 58. This line discharges into line 50 and thus the hot nitrogen entering the tube 22 picks up the barium carbonate pellets and carries them into the tube 22. A fluidized bed of barium oxide or a mixture of barium carbonate and barium oxide is maintained in tube 22, the upper level of this fluid bed being at the level of the overflow pipe 60. This overflow pipe discharges the calcined product. In order to permit the nitrogen to by-pass the preheater and/or the pellet feeding line, by-pass lines 62, 64, and 66 are provided. Effluent gases from the reaction escape above the fluid bed through the top of the tube, as indicated in the drawing.

The practice of this process is especially advantageous since it tends to avoid fusion of the barium carbonate during calcination. Preferably, the fluidized bed is so operated that it is largely barium oxide. It will be understood that inasmuch as the bed itself is turbulent, its composition is substantially uniform, particularly in the upper portions thereof. As a consequence of the calcination, the fluid bed will contain substantial portions of barium oxide and barium carbonate together with some barium peroxide. There is also present a concentration of carbon, depending upon the amount of carbon incorporated in the barium carbonate product introduced into the bed.

In calcining barium carbonate according to this method, the fluid bed may be operated in a manner such as to achieve any degree of calcination from ten to one hundred percent. On the other hand, best results are obtained when the barium oxide content of the bed is in excess of 50 percent of the BaO content of the barium carbonate going into the fluidized bed. This method affords a convenient method of avoiding the difficulties encountered in conventional calcining processes which appear to be due to formation of a barium oxide-barium carbonate eutectic. Thus, there is a definite indication that such eutectic melts at a much lower temperature than do either barium oxide or barium carbonate and, consequently, the eutectic which may be formed during calcination tends to promote fusion of the product. In contrast, the present process affords a convenient method wherein the barium carbonate is added to a calcining bed which contains a large amount of barium oxide. Thus, the composition of the bed, with respect to barium oxide and barium carbonate, is above that at which the barium oxide-barium carbonate eutectic has been regarded to exist. Because the overall composition of the bed is such that the barium oxide content thereof is above that at which the low melting barium oxide-barium carbonate eutectic is formed, fusion is minimized. For this reason, it is found advantageous to conduct the calcination under conditions such that the bed contains at least 50 to 75 percent, and preferably in excess of 90 percent, of BaO based upon the total amount of BaO and barium carbonate in the fluidized bed.

It will be understood, of course, that the process may be conducted in a plurality of stages. Thus, two or more fluidized beds of barium oxide and barium carbonate may be provided in order to effect a partial calcination in one bed and a further calcination in another bed. In such a case, the degree of calcination in the first bed may be quite incomplete and the bed may contain as little as 30 percent barium oxide, based upon the total BaO entering the bed. However, even in such cases it is found most advantageous to conduct the operation so that the major portion of the BaO (more than ½) in the fluidized bed is present in the bed as barium oxide. In optimum operation, the beds may contain 90 to 98 percent of barium oxide, based upon the total BaO in the bed. While beds of higher barium oxide content may be operated, this is usually impractical.

The following is an illustrative example of this embodiment of the invention:

*Example I*

The apparatus illustrated in Fig. 1 was used. In this test, the calcination reactor comprised a metal tube 22 having a diameter of 4 inches at the top of the bed level and a diameter of 3 inches at the end of the tube where it was tapered to provide the inlet for the reactants. The distance between the end of the tube and the top of the bed was 56 inches. The nitrogen preheater constituted a 4-inch diameter tube 12 which was 36 inches long.

In a typical operation, 100 parts by weight of finely divided barium carbonate having a particle size of minus 100 to plus 300 mesh, 7 parts by weight of carbon lampblack, and one part by weight of an aqueous paste of wheat starch, were mixed together using an amount of water sufficient to make a stiff plastic mass. The product was extruded through dies approximately 1/16 inch in diameter. The extruded product was baked for about 12 hours at a temperature of about 140° C. The resulting product comprised a plurality of particles approximately 1/16 inch in diameter and ranging from about 1/16 to 1/4 inch in length.

These products were then cracked or mildly crushed, and the crushed product was screened to obtain a product ranging from minus 14 to plus 30 mesh in size.

In the calcination, nitrogen was introduced into the bottom of the nitrogen preheater and passed through a fluidized bed of graphite granules having a particle size of about minus 14 to plus 80 mesh. The temperature of the nitrogen gas escaping from this bed was approximately 540° C. The temperature of the bed was approximately 850 to 900° C. Consequently, the oxygen and carbon dioxide in the nitrogen were almost quantitatively converted to carbon monoxide (note that the nitrogen entering the fluid carbon bed contained 0.4 to 0.8 percent by volume of oxygen and only a minute amount of carbon dioxide).

The resulting heated nitrogen was fed into the calcination reactor at a rate of 200 to 265 cubic feet per hour, computed at 760 millimeters pressure and 70° F. About 20 pounds of previously calcined barium carbonate granules, of the type described above and containing in excess of 95 percent BaO, were dumped into the reactor and a fluidized bed was established in the reactor. The temperature of this bed was maintained throughout the run at about 945 to 965° C. During the run, the barium carbonate granules were fed into the nitrogen at a rate of 13 to 14 pounds per hour. The operation was continued over a period of 18 hours and the product withdrawn continuously. This product contained 94 to 99 percent by weight of barium oxide. No scale deposit was apparent on the wall. Only a very small amount of solids fed to the reactor were carried off as solids in the gas stream in the form of dust.

*Example II*

Using the apparatus described in Example I, a fluidized bed of baked barium carbonate granules having a particle size such that 100 percent passed through 14 mesh and remained on 30 mesh was established. These granules were prepared as described in Example I except that 4 parts by weight of carbon and one part by weight of wheat starch were used per 100 parts by weight of barium carbonate.

These granules were fed to the reactor at a rate of 14.4 pounds per hour, according to the process of Example I. Nitrogen preheated to a temperature of approximately 550° C., flowing at a rate of 200 to 285 cubic feet per hour and measured at 760, was mixed with a stream of cold methane flowing at a rate of 56 cubic feet per hour. These gas flows were measured in terms of the flow at 70° F. and 760 millimeters pressure. The resulting gas mixture was fed into the bottom of the reactor as in Example I, and was used to maintain the fluidized bed. The operation was continued over a period of 7 hours and the resulting product was continually withdrawn during the run. This product contained 92 to 97 percent BaO. There was no detectable scaling of the reactor wall or fusion of the reaction mixture.

*Example III*

The procedure in this experiment was substantially that described in Example I, and the equipment was the same. The feed was a mixture of 7 parts by weight of carbon, one part by weight of wheat paste, and 100 parts by weight of barium carbonate, the particles which were greater in size than 14 mesh or less than 30 mesh being screened out. The feed of these granules was 10.4 pounds per hour. The nitrogen was heated in the preheater at a temperature of about 500° C. and fed into the reactor at a rate of 225 cubic feet per hour. Prior to introducing the nitrogen into the reactor, it was mixed with cold methane introduced at a rate of 50 cubic feet per hour. These gas flows are expressed in terms of their volume at 760 millimeters pressure at 70° F. This mixture was fed into the bottom of the reactor and used to establish the fluidized bed. The temperature of the reaction bed was maintained at 950° C. throughout the run. The run was continued for a period of 3¾ hours at these conditions, and the product which was withdrawn continually during the run contained 93 to 95 percent BaO. No scale or deposit was apparent on the tube wall and no accumulation of scale or fused product developed within the reactor.

The barium carbonate used in the runs was substantially all barium carbonate containing small amounts, usually not in excess of about 1 or 2 percent of barium hydroxide and, in some cases, a small amount of sulphur, usually not in excess of about ½ to 1 percent.

*Example IV*

Barium carbonate granules were calcined substantially as disclosed in Example I, with the following changes: The furnace used had an internal diameter of 8 inches. The feed size of the granules was minus 12 plus 30 mesh, the preponderant portion being plus 20 mesh. The carbon content of the granules was 5.75 to 6.25 percent by weight of the barium carbonate. The granules were fed to the furnace at a rate of 25 to 35 pounds per hour while the percent of barium oxide in the bed remained at 86 to 97 percent by weight. Nitrogen was introduced at a rate of 17 to 18 cubic feet per minute, computed at 760 millimeters pressure and 70° F. The gas escaping the reactor contained 89 to 93 percent nitrogen, the bed temperature was 1690 to 1720° F., and the run was continued for 208 hours. The gas velocity in the bed was 4.3 feet per second.

*Example V*

The process of Example IV was repeated with the following conditions:

Granule size _____ Minus 16 plus 50 mesh (over 50% below 30 mesh).
Percent carbon _____ 5.7 to 5.9% by weight.
Granule feed rate _____ 14 to 26 pounds per hour.
Temperature _____ 1700 to 1710° F.
Gas velocity in bed _____ 2.9 feet per second.
Percent BaO in bed _____ 90 to 93% by weight.
Nitrogen in escaping gas__ 87 to 94%.
Duration of run _____ 29 hours.

Although the present invention has been described with reference to the specific details of certain embodiments, it is not intended that such details shall be regarded as limitations upon the scope of the invention except insofar as included in the accompanying claims.

This application is a continuation-in-part of our copending application Serial No. 279,786, filed April 1, 1952.

What is claimed:

1. A method of calcining barium carbonate which comprises heating a bed of porous barium carbonate granules comprising finely divided barium carbonate and carbon bonded together, the preponderant portion of said granules having a particle size of 4 to 80 mesh, at a temperature of 850 to 1025° C. while fluidizing said bed in an upwardly rising stream of nitrogen containing gas flowing at a rate of 1 to 7 feet per second while correlating the rate of calcination and the rate of nitrogen introduction so that the concentration of nitrogen in the evolved gas flowing from the bed is at least 70 percent by volume of said gas, maintaining the amount of carbon dioxide, $H_2O$, and elemental oxygen in the nitrogen supplied to the bed each below 0.5 percent by volume, and supplying the heat for the calcination through a wall while maintaining the fluidized bed in contact with said wall.

2. A method of calcining barium carbonate which comprises heating a bed of porous barium carbonate granules comprising finely divided barium carbonate and carbon bonded together, the preponderant portion of said granules having a particle size of 4 to 30 mesh, at a temperature of 900 to 975° C. while fluidizing said bed in an upwardly rising stream of nitrogen containing gas flowing at a rate of 1 to 7 feet per second while correlating the rate of calcination and the rate of nitrogen introduction so that the concentration of nitrogen in the evolved gas flowing from the bed is at least 80 percent by volume of said gas, maintaining the amount of carbon dioxide, $H_2O$, and elemental oxygen in the nitrogen supplied to the bed each below 0.5 percent by volume, and supplying the heat for the calcination through a wall while maintaining the fluidized bed in contact with said wall.

3. A method of calcining barium carbonate which comprises heating a bed of porous barium carbonate granules comprising finely divided barium carbonate and carbon bonded together, the preponderant portion of said granules having a particle size of 4 to 80 mesh, at a temperature of 850 to 1025° C. while fluidizing said bed in an upwardly rising stream of nitrogen containing gas flowing at a rate of 1 to 7 feet per second while correlating the rate of calcination and the rate of nitrogen introduction so that the concentration of nitrogen in the evolved gas flowing from the bed is at least 70 percent by volume of said gas, maintaining the amount of carbon dioxide, $H_2O$, and elemental oxygen in the nitrogen supplied to the bed each below 0.5 percent by volume, and supplying the heat for the calcination through a wall while maintaining the fluidized bed in contact with said metallic wall.

4. A method of calcining barium carbonate which comprises heating a bed of porous barium carbonate granules comprising finely divided barium carbonate and carbon bonded together, the preponderant portion of said granules having a particle size of 4 to 30 mesh, at a temperature of 900 to 975° C. while fluidizing said bed in an upwardly rising stream of nitrogen containing gas flowing at a rate of 1 to 7 feet per second while correlating the rate of calcination and the rate of nitrogen introduction so that the concentration of nitrogen in the evolved gas flowing from the bed is at least 80 percent by volume of said gas, maintaining the amount of carbon dioxide, $H_2O$, and elemental oxygen in the nitrogen supplied to the bed each below 0.5 percent by volume, and supplying the heat for the calcination through a wall while maintaining the fluidized bed in contact with said metallic wall.

5. A method of calcining barium carbonate which comprises mixing finely divided barium carbonate with finely divided carbon, water, and a carbonizable binder capable of evolving a gaseous component upon heating, forming granules of the resulting mixture, heating the granules at a temperature at which water is driven off and porous granules are obtained, establishing a bed of said granules, and heating the bed to calcination temperature while passing through the bed an upwardly flowing inert gaseous stream which initially is composed of nitrogen in which neither the oxygen nor the carbon dioxide exceeds 0.5 percent, the rate of flow of said gaseous stream being sufficient to fluidize the bed.

6. The process of claim 5 wherein the binder is wheat paste.

7. The process of claim 5 wherein the bed of granules have an average particle size of about 4 to 80 mesh, and the barium carbonate a particle size below 100 mesh.

8. A method of calcining barium carbonate which comprises calcining a bed of granules composed of a mixture of finely divided barium carbonate and finely divided carbon bonded together, while passing thorugh the granule bed an inert gaseous stream which is initially composed of nitrogen in which the oxygen and carbon dioxide concentrations both are less than 0.5 percent, heating the bed at a temperature of 850 to 1025° C. and thereby causing production of barium oxide and evolution of gaseous carbon monoxide, and correlating the rate of calcination with the rate of nitrogen introduction into the bed so that the concentration of nitrogen in the gas flowing from the bed is at least 70 percent by volume.

9. A method of calcining barium carbonate which comprises establishing a fluidized bed of porous granules composed of a mixture of finely divided barium carbonate and finely divided carbon bonded together in an upwardly flowing inert gas stream composed preponderantly of nitrogen and which initially contains less than 0.5 percent of oxygen and less than 0.5 percent of carbon dioxide, and heating the bed to calcination temperature through a wall in contact therewith to a temperature of 850 to 1025° C. and thereby causing production of barium oxide and gaseous carbon monoxide, and correlating the rate of calcination with the rate of nitrogen introduction into the bed so that the concentration of nitrogen in the gas flowing from the bed is at least 70 percent by volume.

10. A method of calcining barium carbonate which comprises establishing a bed of granules which are composed of a mixture of finely divided barium carbonate and finely divided carbon bonded together by a carbonaceous binder in a metal reactor, and externally heating the barium carbonate mixture to calcination temperature through the metal walls of the reactor while passing into the reactor and through the bed a gaseous stream composed preponderantly of nitrogen in which the oxygen and carbon dioxide concentrations both are less than 0.5 percent, said granules having a particle size in excess of 80 mesh.

11. A method of calcining barium carbonate which comprises establishing a fluidized bed of barium carbonate and carbon in an upwardly rising stream of nitrogen, heating the bed to calcination temperature and thereby to produce barium oxide and gaseous carbon monoxide while correlating the rate of calcination with the rate of nitrogen flow to the bed so that the concentration of nitrogen in the gas flowing from the bed is at least 80 percent by volume.

References Cited in the file of this patent

UNITED STATES PATENTS

| 886,607 | Jacobs | May 5, 1908 |
| 1,047,077 | Kirchner | Dec. 10, 1912 |
| 1,243,190 | Kremers | Oct. 16, 1917 |
| 1,947,952 | Nitzshke | Feb. 20, 1934 |
| 2,465,410 | White | Mar. 29, 1949 |

FOREIGN PATENTS

| 5,280 | Great Britain | 1885 |

OTHER REFERENCES

Kalbach, "Improving Solids-Gas Contacting by Fluidization," June 1944, Chem. and Metallurgical Eng., pages 94–98.

Kalbach, "Fluidization in Chem. Reactions," pages 105, 108 in Chem. Eng., January 1947.

Gordon Kidoo, "Flow in Fluidized Reactions Systems," pages 112, 114 in Chem. Eng., May 1949.